(12) United States Patent
Giles et al.

(10) Patent No.: US 10,415,244 B2
(45) Date of Patent: Sep. 17, 2019

(54) METHODS FOR MANUFACTURING PRE-FABRICATED INSULATED FOAM WALL STRUCTURES WITH HIGH RACKING STRENGTH AND RELATED PRE-FABRICATED WALL STRUCTURES

(71) Applicant: Covestro LLC, Pittsburgh, PA (US)

(72) Inventors: Eric C. Giles, Pittsburgh, PA (US); James L. Lambach, McMurray, PA (US); David M. Baily, Upper Saint Clair, PA (US)

(73) Assignee: COVESTRO LLC, Pittsburgh, PA (US)

( * ) Notice: Subject to any disclaimer, the term of this patent is extended or adjusted under 35 U.S.C. 154(b) by 0 days.

(21) Appl. No.: 15/622,684

(22) Filed: Jun. 14, 2017

(65) Prior Publication Data

US 2018/0363298 A1 Dec. 20, 2018

(51) Int. Cl.
*E04C 2/292* (2006.01)
*E04B 1/14* (2006.01)
(Continued)

(52) U.S. Cl.
CPC .......... *E04C 2/292* (2013.01); *B29C 44/1285* (2013.01); *B29C 44/186* (2013.01);
(Continued)

(58) Field of Classification Search
CPC .............. E04C 2/292; E04B 1/14; B32B 5/18
See application file for complete search history.

(56) References Cited

U.S. PATENT DOCUMENTS 4,443,988 A 4/1984 Coutu, Sr.
4,471,591 A 9/1984 Jamison
(Continued)

FOREIGN PATENT DOCUMENTS

DE 202014004695 U1 7/2014
IE 20050080 A1 8/2006
(Continued)

OTHER PUBLICATIONS

Grisolia, Anthony et al; U.S. Appl. No. 14/816,589; Title: Wall Structure Penetration Attachment; Assigned to: Covestro LLC; filed Aug. 3, 2015.
(Continued)

*Primary Examiner* — Babajide A Demuren
(74) *Attorney, Agent, or Firm* — Donald R. Palladino

(57) ABSTRACT

Methods of manufacturing wall structures having high racking strength are described in this specification. The methods include spray applying a foam-forming composition into a cavity of a wall structure, wherein the wall structure is disposed in a climate-controlled spray application station and allowing the foam-forming material to expand within at least a portion of the cavity to form a foam layer deposited in the cavity. In the methods, the foam layer is formed in-situ during the manufacturing method, and the density of the foam layer is selected and the relative humidity and dew point of the air in the climate-controlled spray application station throughout the spray applying is selected so that the wall structure has a racking strength of at least 500 pounds per linear foot.

26 Claims, 11 Drawing Sheets

(51) Int. Cl.
  *B29C 44/12* (2006.01)
  *B29C 44/18* (2006.01)
  *B29C 44/34* (2006.01)
  *E04C 2/20* (2006.01)
  *E04C 2/38* (2006.01)
  *E04C 2/296* (2006.01)
  *B32B 5/18* (2006.01)
  *B29K 625/00* (2006.01)
  *B29K 75/00* (2006.01)
  *B29L 31/00* (2006.01)
  *B29K 675/00* (2006.01)

(52) U.S. Cl.
  CPC ........ *B29C 44/188* (2013.01); *B29C 44/3403* (2013.01); *E04B 1/14* (2013.01); *E04C 2/205* (2013.01); *E04C 2/296* (2013.01); *E04C 2/38* (2013.01); *B29K 2075/00* (2013.01); *B29K 2625/06* (2013.01); *B29K 2675/00* (2013.01); *B29K 2995/0063* (2013.01); *B29L 2031/776* (2013.01); *B32B 5/18* (2013.01)

(56) References Cited

U.S. PATENT DOCUMENTS

| | | | |
|---|---|---|---|
| 4,671,038 | A | 6/1987 | Porter |
| 4,765,105 | A | 8/1988 | Tissington et al. |
| 4,786,547 | A * | 11/1988 | St-Michel ............... B32B 21/02 428/215 |
| 4,856,244 | A | 8/1989 | Clapp |
| 5,353,560 | A | 10/1994 | Heydon |
| 5,389,167 | A | 2/1995 | Sperber |
| 5,950,386 | A | 9/1999 | Shipman et al. |
| 5,950,389 | A | 9/1999 | Porter |
| 5,953,883 | A | 9/1999 | Ojala |
| 5,979,131 | A | 11/1999 | Remmele et al. |
| 6,085,479 | A | 7/2000 | Carver |
| 6,205,729 | B1 | 3/2001 | Porter |
| 6,308,491 | B1 | 10/2001 | Porter |
| 6,314,695 | B1 | 11/2001 | Belleau |
| 6,332,304 | B1 | 12/2001 | Fuhrman |
| 6,408,594 | B1 | 6/2002 | Porter |
| 6,438,915 | B1 | 8/2002 | Beauboeuf |
| 6,481,172 | B1 | 11/2002 | Porter |
| 6,613,425 | B2 * | 9/2003 | LeDuc ............... B29C 47/0066 428/316.6 |
| 6,854,218 | B2 | 2/2005 | Weiss |
| 6,951,079 | B2 | 10/2005 | Weiss |
| 7,036,284 | B1 | 5/2006 | Larson |
| 7,127,856 | B2 | 10/2006 | Hagen, Jr. et al. |
| 7,127,858 | B2 | 10/2006 | Layfield |
| 7,168,216 | B2 | 1/2007 | Hagen, Jr. |
| 8,033,065 | B2 | 10/2011 | Paetkau et al. |
| 8,065,846 | B2 | 11/2011 | McDonald et al. |
| 8,365,497 | B2 | 2/2013 | Rothwell |
| 8,397,387 | B2 | 3/2013 | Cole et al. |
| 8,397,465 | B2 | 3/2013 | Hansbro et al. |
| 8,458,983 | B2 | 6/2013 | Propst |
| 8,635,778 | B1 | 1/2014 | Hagaman |
| 8,844,243 | B1 | 9/2014 | Gillman |
| 8,925,270 | B2 | 1/2015 | Grisolia et al. |
| 8,959,862 | B1 | 2/2015 | Kreizinger |
| 2004/0016194 | A1 | 1/2004 | Stefanutti et al. |
| 2004/0200171 | A1 | 10/2004 | Schilger |
| 2005/0055973 | A1 | 3/2005 | Hagen, Jr. et al. |
| 2005/0106360 | A1 | 5/2005 | Johnston et al. |
| 2005/0247021 | A1 | 11/2005 | Schauffelle |
| 2009/0098357 | A1 * | 4/2009 | Bergtold ............... B32B 5/18 428/218 |
| 2010/0011701 | A1 | 1/2010 | Cole et al. |
| 2011/0173911 | A1 | 7/2011 | Propst |
| 2011/0214374 | A1 | 9/2011 | Propst |
| 2012/0011792 | A1 | 1/2012 | DeWildt et al. |
| 2012/0028563 | A1 | 2/2012 | Sacks et al. |
| 2012/0096785 | A1 | 4/2012 | Weeks |
| 2012/0240501 | A1 | 9/2012 | Spiegel |
| 2012/0247040 | A1 | 10/2012 | Buoni et al. |
| 2013/0104480 | A1 | 5/2013 | Smith |
| 2013/0305643 | A1 | 11/2013 | Singleton et al. |
| 2013/0312350 | A1 | 11/2013 | Kreizinger |
| 2014/0115991 | A1 | 5/2014 | Sievers et al. |
| 2014/0265027 | A1 | 9/2014 | Kreizinger |
| 2015/0093535 | A1 | 4/2015 | Lambach et al. |
| 2015/0111001 | A1 * | 4/2015 | Sagnard ............... E04F 13/0876 428/159 |
| 2015/0140243 | A1 * | 5/2015 | Sagnard ............... B32B 5/18 428/34.7 |
| 2016/0326740 | A1 | 10/2016 | Parsons et al. |
| 2018/0187417 | A1 * | 7/2018 | Kreizinger ............... E04C 2/38 |
| 2018/0202159 | A1 * | 7/2018 | Kreizinger ............... E04C 2/284 |

FOREIGN PATENT DOCUMENTS

| | | |
|---|---|---|
| WO | 9914442 | 3/1999 |
| WO | 9929978 | 6/1999 |
| WO | 2009006441 A2 | 1/2009 |

OTHER PUBLICATIONS

Grisolia, Anthony et al; U.S. Appl. No. 14/816,668; Title: Stucco Wall Structure; Assigned to: Covestro LLC; filed Aug. 3, 2015.

Oertel, Günther, Polyurethane Handbook (2nd Edition), 1994, p. 276.

* cited by examiner

METHODS FOR MANUFACTURING PRE-FABRICATED INSULATED FOAM WALL STRUCTURES WITH HIGH RACKING STRENGTH AND RELATED PRE-FABRICATED WALL STRUCTURES

FIELD

The present invention relates to methods for making pre-fabricated insulated wall structures with high racking strength, as well as the wall structures made by such methods. The methods can provide high strength pre-fabricated wall structures through the use of foam panels that have relatively low fastener pull-out strength as compared to wood panels, plywood panels, and oriented strand board panels (OSBs) and thus do not require the use of such wood panels, plywood panels or OSBs.

BACKGROUND

Insulated wall panels provide thermal insulation for residential homes and buildings. A wall panel's R-value reflects its ability to impede heat flow. The greater the ability to impede heat flow, the higher the R-value. Over the years, insulation standards have become stricter, requiring higher R-values and continuous insulation on the exterior side of insulated walls. The current market solutions to these stricter requirements are typically (1) pre-fabricated wall panels that incorporate insulation at the construction site, and (2) Structural Insulated Panels (SIPs).

The pre-fabricated wall panel that incorporates insulation at the construction site is the more widely adopted solution in the market. However, this solution requires a separate sub-contractor for on-site installation with fiberglass batting, which is known to have suboptimal R-values. Fiberglass is not an air barrier and allows for air intrusion, thus increasing the probability of condensation and mold growth within wall systems. Furthermore, additional material is necessary to finish the wall (e.g., Oriented Strand Panels (OSBs) and house wrap) and the overall construction process duration is extended, thereby increasing the risk of trade scheduling conflicts. Installing insulation onsite also leads to potential inconsistencies in insulation installation, performance, and usage.

The second solution, SIPs, also have several drawbacks. SIPs typically utilize expanded polystyrene (EPS) foam insulation sandwiched between two OSB panels, which only provide thermal performance of about R-4 per inch. Additionally, current SIPs are mainly used by smaller scale home builders with high levels of home customization.

More recently, insulated wall structures satisfying the strict industry insulation requirements that can be made without excessive material and labor costs have been proposed. According to one proposal, a foam wall structure includes a polyiso panel attached to at least a portion of a front frame surface, such that the polyiso panel and frame members define one or more voids within the frame; and a foam layer received within at least a portion of one of the voids within the frame, wherein the foam layer adheres to at least a portion of the polyiso panel.

While such foam wall structures can provide many benefits, it would be desirable to provide processes for producing such pre-fabricated foam wall structures that satisfy the strict industry insulation requirements and that have excellent racking strength without requiring the use of OSB panels or other panels constructed of materials that have a relatively high fastener pull out strength.

The present invention has been made in view of the foregoing desire.

SUMMARY

In certain respects, the specification relates to methods of manufacturing a high racking strength pre-fabricated insulated wall structure. These methods comprise: (a) spray applying a foam-forming composition into a cavity of a wall structure comprising: i) a first member; ii) a second member spaced apart from the first member; and iii) connecting members extending between the first member and the second member, wherein the first member, the second member, and the connecting members each comprise a front surface and a rear surface that form the front frame surface and a rear frame surface; and iv) a foam panel attached to the front frame surface, such that foam panel, the first member, the second member, and the connecting members define a cavity within the frame; and (b) allowing the foam-forming material to expand within at least a portion of the cavity to form a foam layer deposited in the cavity. In the methods, the foam layer is formed in-situ during the manufacturing process of the wall structure. In addition, in these methods, the density of the foam layer is selected and the relative humidity and dew point of the air in the location of the spray applying is maintained so that the wall structure has a racking strength of at least 500 pounds per linear foot (2224 N).

In other respects, the specification relates to methods of manufacturing a high racking strength pre-fabricated insulated wall structure. These methods comprises: (a) spray applying a foam-forming composition into a cavity of a wall structure, wherein the wall structure comprises: i) a first member; ii) a second member spaced apart from the first member; and iii) connecting members extending between the first member and the second member, wherein the first member, the second member, and the connecting members each comprise a front surface and a rear surface that form the front frame surface and a rear frame surface; and iv) a foam panel attached to the front frame surface, such that foam panel, the first member, the second member, and the connecting members define a cavity within the frame; and (b) allowing the foam-forming material to expand within at least a portion of the cavity to form a foam layer deposited in the cavity. These methods are carried out at a facility remote from a building construction site, and, in these methods, the density of the foam layer is 2.8 to 4.0 lb/ft$^3$ (44.9 to 64.1 kg/m$^3$) when measured according to ASTM D1622-08 and the relative humidity of the air in the spray application station is less than 75%, such as no more than 70%, and the dew point is no more than 75° F. (23.9° C.), such as no more than 70° F., throughout the spray applying.

In still other respects, the present invention is directed to high racking strength pre-fabricated insulated wall structures. These wall structures comprise a) a first member; b) a second member spaced apart from the first member; c) connecting members extending between the first member and the second member, wherein the first member, the second member, and the connecting members each comprise a front surface and a rear surface that form the front frame surface and a rear frame surface; d) a foam panel attached to the front frame surface, such that foam panel, the first member, the second member, and the connecting members define a cavity within the frame; and e) a foam layer deposited in the cavity and adhered to the foam panel. Such wall structures have a racking strength of at least 500 pounds per linear foot (2224 N) when the wall structure is tested without the presence as part of the wall structure of a wood panel, a plywood panel, an oriented strand board panel, a fibrous structural panel, a gypsum panel, and/or a composite panel that includes a wood panel or a fibrous panel.

BRIEF DESCRIPTION OF THE DRAWINGS

Various features and characteristics of the inventions described in this specification may be better understood by reference to the accompanying figures, in which.

The reader will appreciate the foregoing features and characteristics, as well as others, upon considering the following detailed description of the inventions according to this specification.

DETAILED DESCRIPTION

As used in this specification, the term "front" refers to the side, face, or surface of a structure or component oriented towards the outside direction of an exterior wall of a building, and the term "rear" refers to the side, face, or surface of a structure or component oriented towards the inside direction of an exterior wall of a building.

As indicated, some embodiments of the invention relate to methods of manufacturing a high racking strength pre-fabricated insulated wall structure. Other embodiments of the invention relate to high racking strength pre-fabricated insulated wall structures that can be produced by such methods. As used herein, "pre-fabricated" means that the insulated wall structure is manufactured at a facility remote from a building construction site. As used herein, "insulated wall structure" means that the wall structure includes a foam layer deposited in a cavity formed by a foam panel and frame members, as described more fully below. As used herein, the term "high racking strength" means that the pre-fabricated insulated wall structure has a racking strength of at least 500 pounds per linear foot (2224 N). The racking strength values reported in this specification are determined according to a modified ASTM E72-15 test in which the test protocol as specified in ASTM E72-15 is used, modified only by racking a test wall structure to failure in one single push rather than using four pushes of ever increasing force. Those skilled in the art will appreciate that the term "racking strength" refers to the ability of a wall structure to resist horizontal in-plane shear forces that typically, though not necessarily exclusively, act on wall structures from wind.

Figure 1:
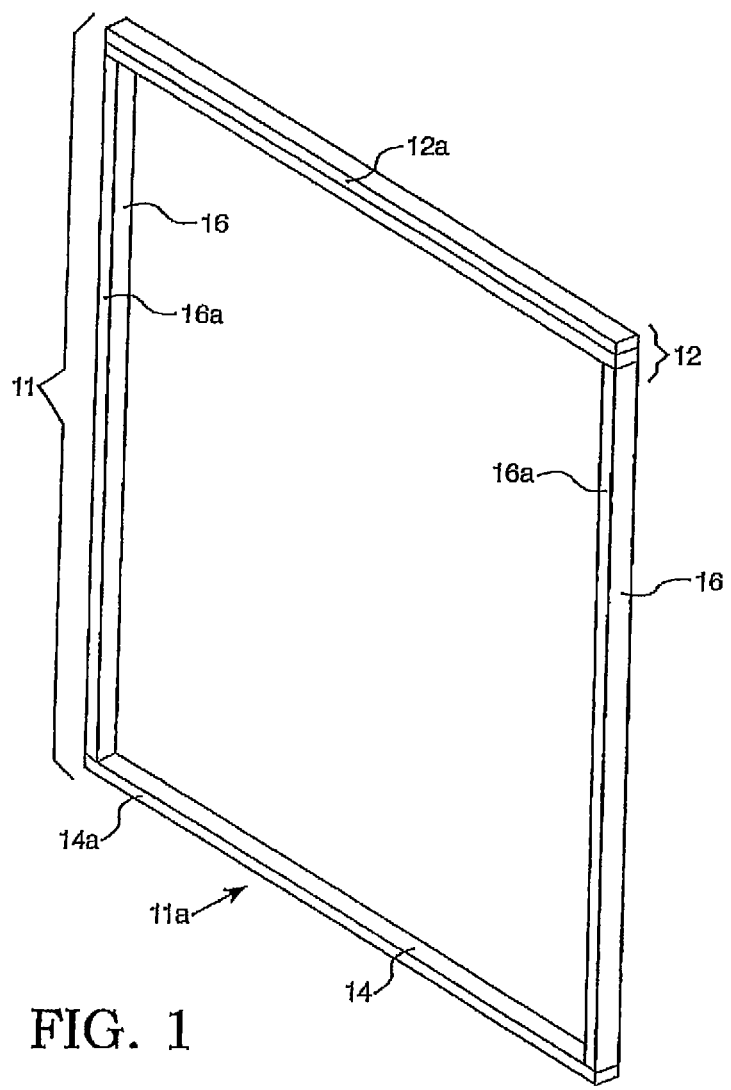
FIG. 1 is a front perspective view of a wall structure frame.
Figure 2:
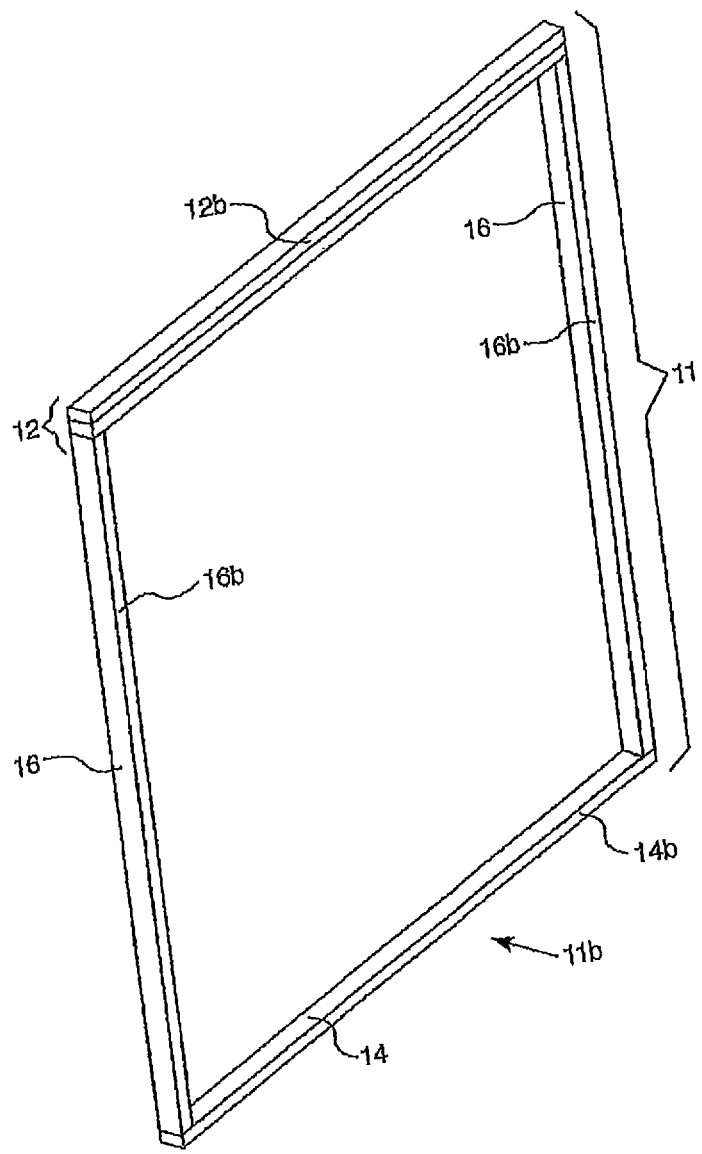
FIG. 2 is a rear perspective view of the wall structure frame shown in FIG. 1.

Pre-fabricated insulated wall structures that can be produced by the methods of the present specification will now be described with reference to the Figures. Referring, for example, to FIGS. 1-4, a pre-fabricated insulated wall structure 10 includes a frame 11, a foam panel 70, and a foam layer 30. As shown in FIGS. 1 and 2, the frame 11 may be defined by a first member 12, a second member 14 spaced apart from the first member 12, and connecting members 16 extending between the first member 12 and the second member 14. The first member 12, the second member 14, and the connecting members 16 each have a front surface 12a, 14a, 16a and a rear surface 12b, 14b, 16b that define a front frame surface 11a and a rear frame surface 11b, respectively. As used herein, the term "connecting member" refers to a member that connects first member 12 with second member 14 and includes side members 16 and primary support members 17.

The frame 11 can be constructed into different shapes depending on its intended use. For example, as shown in FIGS. 1 and 2, the frame 11 can be constructed as a conventional industry standard rectangular or square frame 11. The first member 12 and the second member 14 may be spaced apart and extend parallel to each other, and the connecting members 16 may extend perpendicular to the first member 12 and the second member 14 so as to from a rectangular or square frame 11. The shape and design of the frame 11 is not so limited and can be constructed into any desired shape. Generally, the shape and design of the frame 11 is constructed in accordance with the floor plans designed for a particular home or building.

Figure 3:
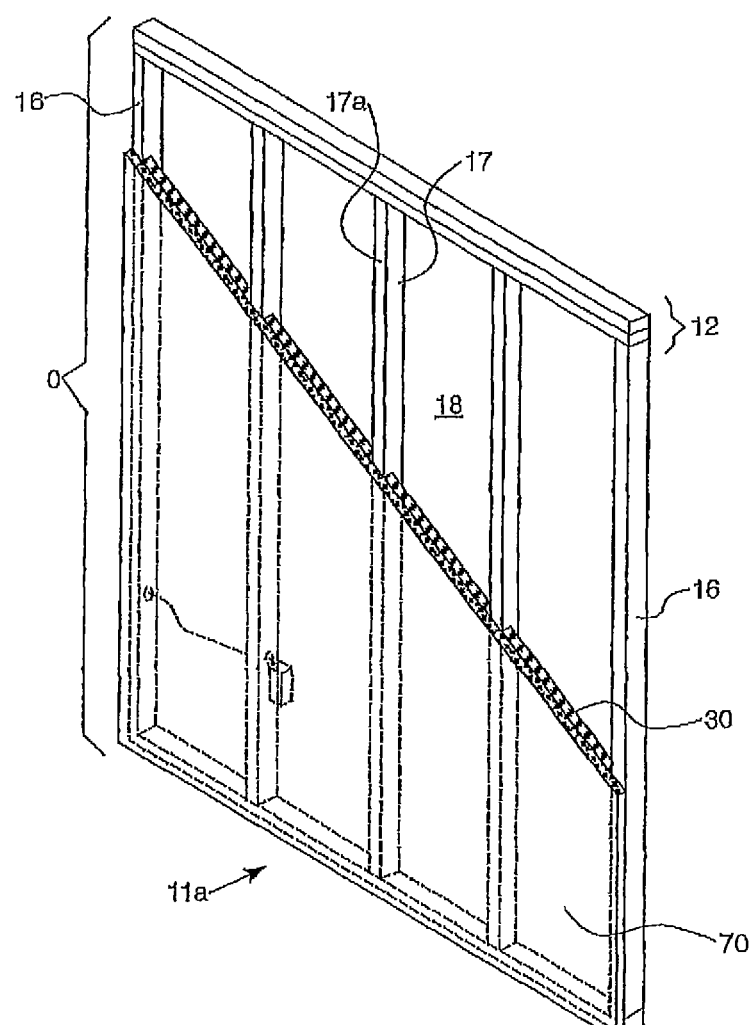
FIG. 3 is a front perspective view of a wall structure comprising a foam panel and a foam layer shown in partial cut-away.
Figure 4:
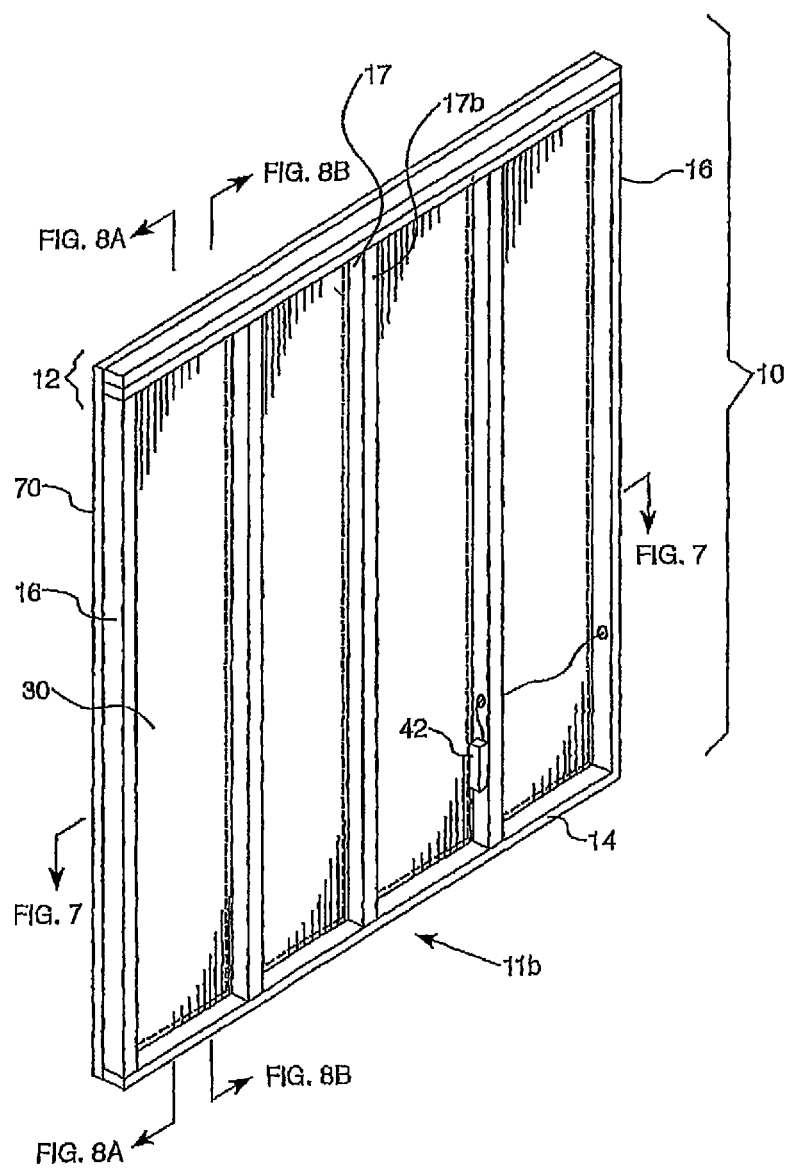
FIG. 4 is rear perspective view of the wall structure shown in FIG. 3.

Referring to FIGS. 3 and 4, at least one other connecting member (i.e., a member connecting the first member 12 to the second member 14), such as primary support member 17, may be positioned between the connecting members 16. The primary support members 17 may extend between the first member 12 and the second member 14. The primary support members 17 may define a front primary support surface 17a and a rear primary support surface 17b. As shown in FIGS. 3 and 4, the front primary support surface 17a and the rear primary support surface 17b correspond to the front frame surface 11a and the rear frame surface 11b of the frame 11. The primary support members 17 may be spaced apart. Cavities 18 may be defined by the space formed within the frame 11 between the primary support members 17, the connecting members 16, the first member 12, and/or the second member 14. The size of each cavity 18 can vary based on the size of the frame 11, the distance between consecutively positioned primary support members 17, and the number of primary support members 17 present, if any. The primary support members 17, the connecting members 16, the first member 12, and/or the second member 14 may comprise one or more plates, panels, beams, studs, or the like. For example, as shown in FIGS. 1-4, the first member 12 may include two beams, although it will be appreciated that more than two beams could be used, if desired.

The connecting members 16, 17 may be fixedly engaged to the first member 12 and the second member 14. For example, the connecting members 16, 17 may be fixedly engaged to the first member 12 and the second member 14 with fasteners. Suitable fasteners include, but are not limited to, nails, nail plates, staples, bolts, screws, and rivets. The first member 12, the second member 14, the connecting members 16, 17 can be made of various materials, such as wood, metal, fiberglass, plastic, wood-polymer composite materials, or a combination of any thereof. The first member 12, the second member 14, the connecting members 16, 17 can be made of the same material or different materials.

The dimensions of the first member 12, the second member 14, the connecting members 16, 17 can vary depending on the intended use of the frame 11. The first member 12, the second member 14, the connecting members 16, 17 can each have any dimension. The first member 12, the second member 14, the connecting members 16, 17 can have the same dimensions. For example, the first member 12, the second member 14, the connecting members 16, 17 may have the same thickness and width dimensions, and the same or different length dimensions. For example, the first member 12, the second member 14, the connecting members 16, 17 can all have a thickness and width and height dimension of nominally 2×4 inches. In another example, the first member 12, the second member 14, the connecting members 16, 17 can all have thickness and width dimensions of nominally 2×6 inches.

The first member 12, the second member 14, and the side members 16 can have the same dimensions, which may be different than the dimensions of the primary support members 17. For example, the first member 12, the second member 14, and the side members 16 may have the same thickness and width dimensions, and the primary support members 17 may have thickness and/or width dimensions that may be different than the dimensions of the first member 12, the second member 14, and the side members 16. For example, the first member 12, the second member 14, and the side members 16 can have thickness and width dimensions of nominally 2×6 inches, and the primary support members 17 can have thickness and width dimension of nominally 2×4 inches.

Figure 5:
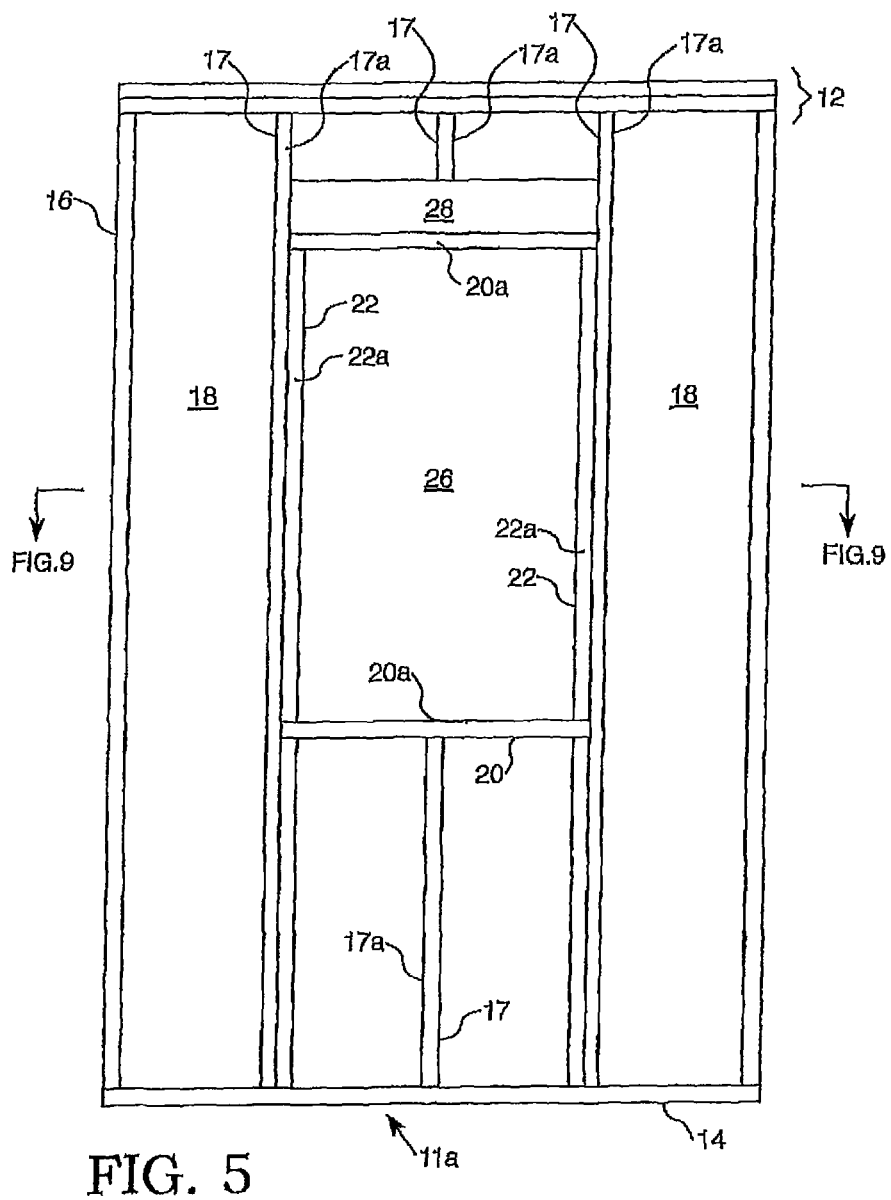
FIG. 5 is a front view of a wall structure frame with a window opening.
Figure 6:
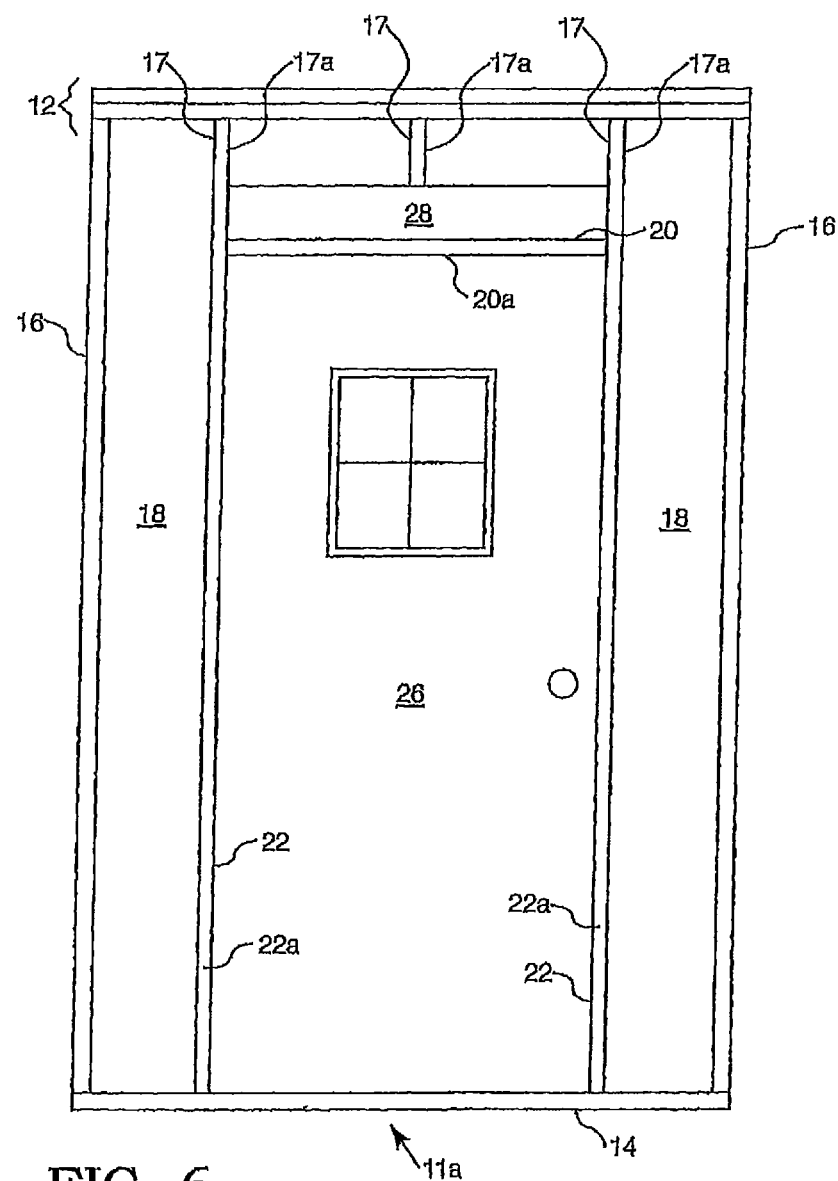
FIG. 6 is a front view of a wall structure frame with a door.

Referring to FIGS. 5 and 6, a wall structure can comprise one or more secondary support members 20, and/or tertiary support members 22. The secondary support members 20 and the tertiary support members 22 may comprise one or more plates, panels, beams, studs, or the like. The secondary support members 20 and the tertiary support members 22 can be incorporated into the frame 11 to provide additional structural support, for example, to form spaces for windows, doors, and the like. The secondary support members 20 and the tertiary support members 22 can have dimensions that are the same as or different than the primary support members 17, the side members 16, the first member 12, and/or the second member 14. For example, the secondary support member 20 and the tertiary support members 22 can have shorter lengths than the primary support members 17, the side members 16, the first member 12, and/or the second member 14.

As shown in FIGS. 5 and 6, the secondary support members 20 may have a front secondary support surface 20*a* and a rear secondary support surface (not shown in FIGS. 5 and 6) that correspond with the front and rear frame surfaces 11*a* and 11*b*, and the front and rear primary support surfaces 17*a* and 17*b*. Similarly, the tertiary support members 22 may have a front tertiary support surface 22*a* and a rear tertiary support surface 22*b* (see FIG. 9) that correspond with the front and rear frame surfaces 11*a* and 11*b* and the front and rear primary support surfaces 17*a* and 17*b*.

The secondary support members 20 extend between and attach to the primary support members 17, or alternatively, the secondary support members 20 extend between and attach to a primary support member 17 and a connecting member 16. The tertiary support members 22 extend between two secondary support members 20 or between a secondary support member 22 and the first member 12 and/or the second member 14.

The secondary support members 20, the tertiary support members 22, the primary support members 17, the connecting members 16, the first member 12, and/or the second member 14 form a secondary cavity 26. As shown in FIGS. 5 and 6, the secondary cavity 26 can be used as a space for a window, a door, or any other opening. For example, the secondary support members 20, the tertiary support members 22, the primary support members 17, the side members 16, the first member 12, and the second member 14 can be constructed as a conventional industry standard rectangular or square wall panel having a window, door, or any other opening. For example, referring to FIG. 5, a rectangular or square wall structure having a window can be formed as follows: a first member 12 and a second member 14 may be spaced apart and extend parallel to each other; side members 16 may extend between the first member 12 and the second member 14 in a direction perpendicular to the first member 12 and the second member 14; primary support members 17 may be positioned between the side members 16 and extend between the first member 12 and the second member 14 in a direction perpendicular to the first member 12 and the second member 14; two secondary support members 20 may be spaced apart and extend between the primary support members 17 in a direction parallel to the first member 12 and the second member 14; and two tertiary support members 22 may be spaced apart and extend between the two secondary members 20 in a direction perpendicular to the secondary support members 20 and the first member 12 and the second member 14. In addition, the primary support members 17 can also extend between the secondary members 20 and the first member 12 and/or the second member 14. As shown in FIG. 5, a secondary cavity 26 may be formed between the secondary support members 20 and the tertiary support members 22. The resulting rectangular or square wall panel can be used in a residential home or building. The shape and design of the frame 11 of the wall structure 10 is not so limited and can assume any shape and design as desired.

Additional support members and structural elements may also be used depending on the intended use of the wall structure 10. For example, and as shown in FIGS. 5 and 6, a header 28 may be used to provide additional support for a door or window. Other additional support members may be used for structural purposes, design purposes, and the like.

Figure 7:
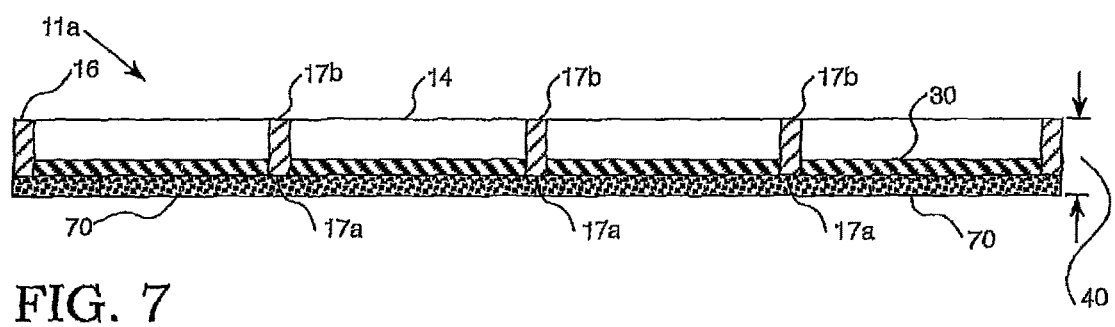
FIG. 7 is a top cross-sectional view of the wall structure shown in FIGS. 3 and 4.
Figure 8A:
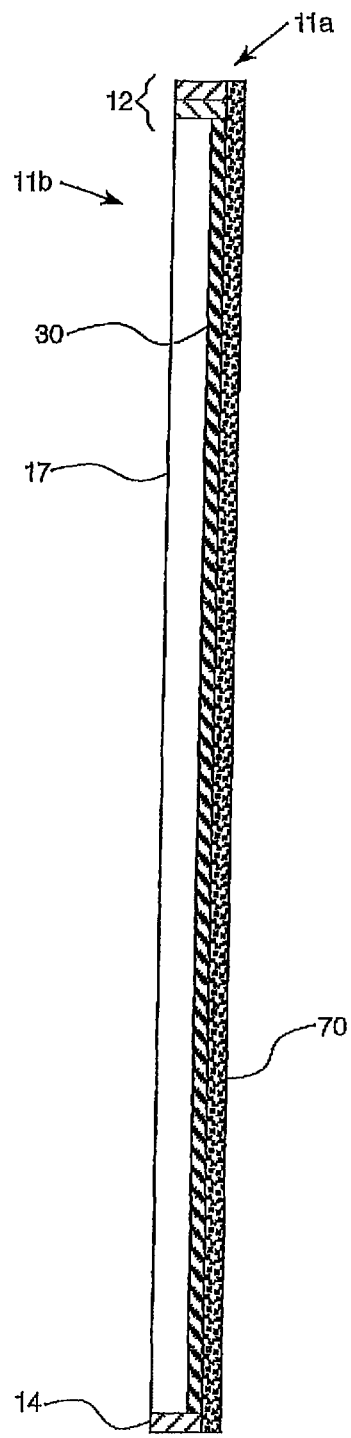
FIG. 8A is a side cross-sectional view of the wall structure shown in FIGS. 3 and 4.
Figure 8B:
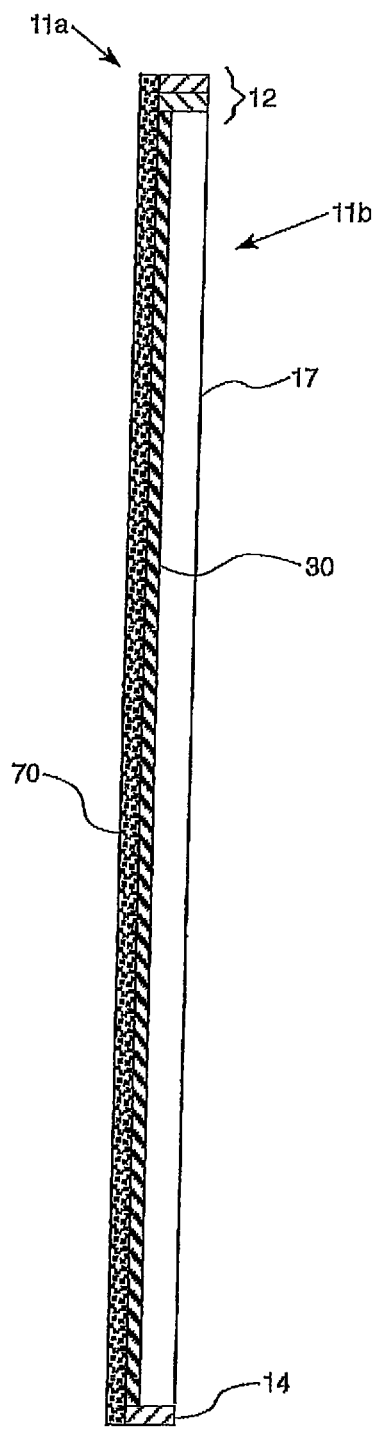
FIG. 8B is a side cross-sectional view of the wall structure shown in FIGS. 3 and 4.

Referring to FIGS. 7, 8A, and 8B, a foam panel 70 may be attached to at least a portion of the front frame surface. As used in this specification, the term "foam panel" refers to panels comprising foam, such as, for example, polyisocyanurate (sometimes referred to as "polyiso") foam panels, expanded polystyrene foam panels, and extruded polystyrene foam panels. As will be appreciated, such foam panels have relatively low fastener pull-out strength as compared to wood panels, plywood panels, and OSBs and other structural panels, such as fibrous structural panels, gypsum panels and composite panels that include a structural sheathing element, such as a wood panel or fibrous panel, and which are commonly known as structural insulated sheathing (SIS). Accordingly, "foam panel" as used in this specification, is to be distinguished from wood panels, plywood panels, OSBs, and other structural panels, such as fibrous structural panels, gypsum panels and SIS. As a result, some embodiments of the methods of the present specification do not include attaching a wood panel, a plywood panel, an OSB, a fibrous structural panel, a gypsum panel, an SIS or, in some cases, any panel, to a front surface of the foam panel or a rear surface of the foam panel between the foam panel and the front frame surface. In some embodiments, the methods of the present specification do not include attaching a wood panel, a plywood panel, an OSB, a fibrous structural panel, a gypsum panel, an SIS or, in some cases, any panel, to the wall structure at any location between the front frame surface and the exterior wall of the building in which the wall structure is placed. In some embodiments, the wall structures of the present specification do not include a wood panel, a plywood panel, an oriented strand board panel, a fibrous structural panel, a gypsum panel, and/or a composite panel that includes a wood panel or a fibrous panel, or, in some cases any other type of panel with a higher fastener pull-out strength than a foam panel. In some embodiments, such wall structures do not include any panels aside from foam panel(s).

As used herein, "foam" refers to a substance that is formed by trapping pockets of gas in a liquid or solid. In certain embodiments, the foams described in this specification are "closed-cell" foams. The term "closed-cell foam", as used in this specification, means that the foam has a closed cell content of at least 80%, sometimes at least 90%, when measured according to ASTM D6226-15, which is incorporated herein by reference. In certain embodiments, the foams described in this specification are "rigid" foams. The term "rigid foam" refers to a foam having a ratio of compressive strength to tensile strength of at least 0.5:1, elongation of less than 10%, and a low recovery rate from distortion and a low elastic limit, as described in "Polyurethanes: Chemistry and Technology, Part II Technology," J. H. Saunders & K. C. Frisch, Interscience Publishers, 1964, page 239, which is incorporated herein by reference. The term "panel", as used in this specification, refers to a solid, relatively thin and flat slab of material, which in some cases, has a rectangular or square shape. In some embodiments, the foam panels described herein have a thickness of no more than 3 inches (7.62 cm), such as a thickness of 1 to 2 inches (2.54 to 5.08 cm) or 1 to 1.5 inches (2.54 cm to 3.81 cm), although, as will be appreciated, other panel thicknesses may be used if desired.

The foam panel 70 attached to the front frame surface 11a can comprise a facer material on the rear face and/or the front face of the foam. For example, the foam panel 70 may comprise a polyiso panel comprising a polyisocyanurate foam layer and a facer material attached to a front face and/or a rear face of the polyisocyanurate foam layer. It is understood that a polyiso panel or other type of foam panel can comprise a facer material attached to just one face, either the front face or the rear face, of a polyisocyanurate foam layer or other core foam layer (e.g., expanded polystyrene or extruded polystyrene).

Polyiso panels and other types of foam panels generally comprise a facer material attached to and substantially covering both sides (the front and rear faces) of a polyisocyanurate foam layer or other core layer. Facer materials can also comprise foil or foil/glass composites. Facer materials can also comprise fibrous materials such as fiberglass materials or other fiber-reinforced sheet-like materials. Examples of suitable facer materials include, but are not limited to, fiberglass mats, glass fiber-reinforced cellulosic felts, coated and polymer-bonded fiber mats (e.g., fibrous glass mats bonded with an organic polymer binder and coated with an organic polymer coating, clay, or other inorganic coating), foils (e.g., aluminum foil), coated foils, foil/membrane laminates, foil/glass composites, and polyolefin films (such as TYVEK® materials, available from DuPont; or TYPAR® materials, available from Fiberweb, Inc.). If a polyiso panel or other type of foam panel comprises facer materials on both the front and rear faces of the polyisocyanurate foam layer or other core layer, then the facer material on the front face may be the same as or may be different than the facer material on the rear face. In some cases, the facer material attached to the rear face comprises a coated glass fiber. The facer material should meet the requirements as described in ASTM D226/D226M-09: Standard Specification for Asphalt-Saturated Organic Felt Used in Roofing and Waterproofing; or ASTM E2556/E2556M-10: Standard Specification for Vapor Permeable Flexible Sheet Water-Resistive Barriers Intended for Mechanical Attachment; or otherwise qualify as a water-resistive barrier in accordance with International Residential Code (IRC) 703.2 (2012), which are each incorporated by reference into this specification. For embodiments in which the first foam panel comprises a polyiso panel, the foam panel may meet the requirements of ASTM C1289-15: Standard Specification for Faced Rigid Cellular Polyisocyanurate Thermal Insulation Panel, which is incorporated by reference into this specification.

In certain embodiments of the methods of the present specification, however, the foam panel comprises a polyiso panel comprising a facer material attached to and substantially covering both sides (the front and rear faces) of a polyisocyanurate foam layer, wherein the facer material comprises a coated glass facer, such as is available under the tradename WEBTECH® CGF, from Atlas Roofing Corporation. In fact, tensile adhesion between such a facer and the foam layer 30 that is formed from the relatively high density foam-forming compositions described below can be unexpectedly greater, when measured according to ASTM D1623-09 Type C, as compared to other facer materials, such as embossed foil and reinforced foil facer, thereby contributing to the ability to produce the high racking strength wall structure described in this specification. For example, in certain embodiments, the tensile adhesion between a coated glass facer and such a foam layer 30 formed from such a composition is greater than 10 lb/in$^2$ (68.9 kPa), such as greater than 15 lb/in$^2$ (103.4 kPa), when measured according to ASTM D1623-09 Type C.

In the methods of this specification, a foam panel 70 is attached to the front frame surface 11a. The foam panel 70 can be attached to any of the front faces (12a, 14a, and/or 16a, 17a) of the constituent members (12, 14, 16, and 17) of the frame 11. For example, the foam panel 70 can be attached to the front faces 12a and 14a of the first and second members 12 and 14 and to the front faces 16a, 17a of the connecting members 16, 17 extending therebetween. The foam panel 70 can be attached to the front frame surface 11a with fasteners and/or an adhesive. Attachment fasteners can include, but are not limited to, nails, staples, screws, bolts, or rivets, or a combination of any thereof. Attachment adhesives can comprise a construction adhesive that is compatible with the adjoining materials. For example, an adhesive used to attach a foam panel to a frame can comprise a foam material (which may be the same foam material or a different foam material as the foam material comprising the foam layer 30 that is described below).

Because foam panel 70 may comprise polyisocyanurate foam or foams having relatively low fastener pull-out strength, care should be used when mechanically fastening first foam panels 70 to frames so as not to damage the foam panels. Alternatively, the foam panel 70 can be attached to the front frame surface by the use of one or more adhesives. The adhesives may be selected from latex-based adhesives, reactive hot melts, polyester adhesives, polyamide adhesives, acrylic adhesives, one-component epoxy-based adhesives, one-component polyurethane-based adhesives, two-component polyurethane-based adhesives, and combinations of any thereof. Also, as mentioned above, a foam material may be used as the adhesive. For example, a layer of foam may be applied to the first foam panel, the front frame surface, or both, before positioning and attaching the first foam panel to the front frame surface.

The foam panel 70 attached to the frame 11 may comprise multiple separate foam panels (i.e., multiple sections) which may be joined together by tape or caulk or polyurethane foam at this stage or later in the process, if desired.

The methods of the present specification comprise spray applying a foam-forming composition into a cavity 18 of a wall structure 10, wherein the wall structure 10 is, in some embodiments of such methods, disposed in a climate-controlled spray application station. More particularly, a foam-forming composition is spray applied into the cavity 18 of the frame 11 having the foam panel 70 attached thereto to form a wall structure 10 having a foam layer 30 deposited in the cavity 18 in which the foam layer 30 adheres to the foam panel 70. The foam layer 30, which adheres to the foam panel 70 comprises a foam material deposited into the frame 11. Various spray application devices can be used to spray the foam composition into the cavity 18. One suitable device is a Fusion CS plural-component spray gun commercially available from Graco Inc. As will be appreciated, polyurethane foam is formed from combining a polyol component that typically comprises one or more polyols, such as polyether polyols and/or polyester polyols, and other additives, such as blowing agents, flame retardants, catalysts, surfactants, among others, and a polyisocyanate component. In these cases, it is often desirable that the polyol component and polyisocyanate component be metered and mixed in a plural-component spray gun at a 1:1 volume ratio.

Examples of foam materials that can be used as foam layer 30 include, but are not limited to, foams made with polyurethane, polyurea, polyisocyanurate (also referred to as polyiso), and mixtures thereof. Foam materials (including the foam layer 30) may, in some cases, be substantially free, may be essentially free, or may be completely free of halogen-containing flame retardant additives. The term "halogen" refers to the halogen elements, which include fluorine, chlorine, bromine, and iodine, and the term "halogen-containing flame retardant additives" refers to a substance that may be used to inhibit or resist the spread of fire, and which contains halogen groups such as a fluoro, chloro, bromo, and/or iodo groups. Further, the term "substantially free," as used in this specification, means the foam material contains less than 1000 parts per million (ppm), "essentially free" means less than 100 ppm, and "completely free" means less than 20 parts per billion (ppb) of halogen-containing flame retardant additives.

In the methods of the present specification, the density of the foam layer 30 is selected and the relative humidity and dew point of the air in the climate-controlled spray application station throughout the spray applying is selected so that the wall structure has a racking strength of at least 500 pounds per linear foot (2224 N). In some embodiments of the methods of the present specification, the wall structure has a racking strength of at least 600 pounds per linear foot (2669 N), such as at least 800 pounds per linear foot (3559 N) or at least 900 pounds per linear foot (4003 N).

To achieve such a wall structure that has the foregoing high racking strengths by the methods of the present specification, the foam-forming composition is, in certain embodiments, formulated so as to provide a foam layer 30 that is of relatively high density. More particularly, in certain embodiments, the density of the foam layer is at least 2.8 lb/ft$^3$ (44.9 kg/m$^3$), such as 2.8 to 4.0 lb/ft$^3$ (44.9 to 64.1 kg/m$^3$), or, in some cases, 3.0 to 4.0 lb/ft$^3$ (48.1 to 64.1 kg/m$^3$) or 3.2 to 3.8 lb/ft$^3$ (51.3 to 60.9 kg/m$^3$) or 3.4 to 3.8 lb/ft$^3$ (54.5 to 60.9 kg/m$^3$), when measured according to ASTM D1622-08.

In addition to the density of foam layer 30, selection of the relative humidity and dew point of the air in the location of the wall structure throughout deposition of foam layer 30 by spray application has been discovered to be critical to achieving such a wall structure produced by the methods of the present specification that has the foregoing high racking strengths. In certain embodiments of the methods of the present specification, to ensure that the relative humidity and dew point of the air in the location of the wall structure throughout deposition of foam layer 30 by spray application is maintained within the necessary ranges, the wall structure is disposed in a climate-controlled spray application station throughout the spray application of the foam layer 30. As used herein, the term "climate-controlled spray application station" refers to a discrete location within a manufacturing facility, such as a spray booth, where spray application of the foam-forming composition takes place and in which the air conditions in the station, including air temperature, relative humidity and dew point, are controlled within target ranges. In some embodiments of the methods of the present specification, the relative humidity of the air is maintained at less than 75%, such as no more than 70%, no more than 60%, no more than 50%, no more than 40%, no more than 30%, or, in some cases, no more than 20%, throughout the spray application. Furthermore, in some embodiments of the methods of the present specification, the dew point of the air is no more than 75° F. (23.9° C.), such as no more than 70° F. (21.1° C.), no more than 60° F. (15.6° C.), no more than 40° F. (4.4° C.), or, in some cases, no more than 30° F. (−1.1° C.), such as 20° to 30° F. (−6.7 to −1.1° C.) throughout the spray application. Furthermore, if desired, the air temperature within the spray application station is maintained within a range of at least 60° F. (15.6° C.), such as at least 65° F. (18.3° C.) and/or no more than 80° F. (26.7° C.), such as no more than 75° F. (23.9° C.) throughout the spray application. Indeed, it has been particularly surprisingly discovered that in at least some cases, extraordinary racking strengths, up to around 900 pounds per linear foot (4003 N) or more, for wall structures produced according to the methods of the present specification can be achieved when (i) the humidity of the air in the spray application station is less than 75%, such as no more than 70%, throughout the spray application, and (ii) the dew point of the air is maintained at 20° to 30° F. (−6.7 to −1.1° C.) throughout the spray application.

Now referring to FIGS. 7, 8A, 8B, and 9 in particular, in some embodiments, the foam layer 30 is spray applied such that it has a thickness extending from a rear surface 70b of the foam panel 70 to a position intermediate the front frame surface 11a and the rear frame surface 11b. In this manner, a gap 40 may be formed within the frame 11 between a rear surface of the foam layer 30 and the rear frame surface 11b. Although in some cases the foam layer 30 has a thickness extending from the rear surface 70b of the first foam panel 70 to a position intermediate the front frame surface 11a and the rear frame surface 11b, it is understood that the foam layer 30 can alternatively comprise a thickness extending from the rear surface 70b of the first foam panel 70 to the rear frame surface 11b, in which case there may be no gap formed within the frame 11 between the rear surface 30b of the foam layer 30 and the rear frame surface 11b. In some embodiments, the gap 40 has a width, from the rear surface of the foam layer 30b to the rear frame surface 11b, of at least 1 inch (2.54 centimeters), such as 1 to 4.5 inches (2.54 to 11.43 centimeters), 1 to 2 inches (2.54 to 5.08 centimeters) or 1.5 to 2 inches (3.81 to 5.08 centimeters). In some embodiments, the foam layer 30 is deposited as a substantially continuous layer within the cavity 18, as shown in the figures, for example, to provide optimal insulating properties. The gap 40 can be used as an area to incorporate home utility components 42 (see FIG. 4) such as electrical wires, cords, heating and cooling pipes, and plumbing fixtures. These home utility components may be inserted into the gap 40 located between the foam layer 30 and the rear frame surface 11b such that utilities components are not surrounded by or contacting the foam layer 30. In one example, the gap 40 comprises at least two inches as measured between the foam layer 30 and the rear frame surface 14.

Figure 9:
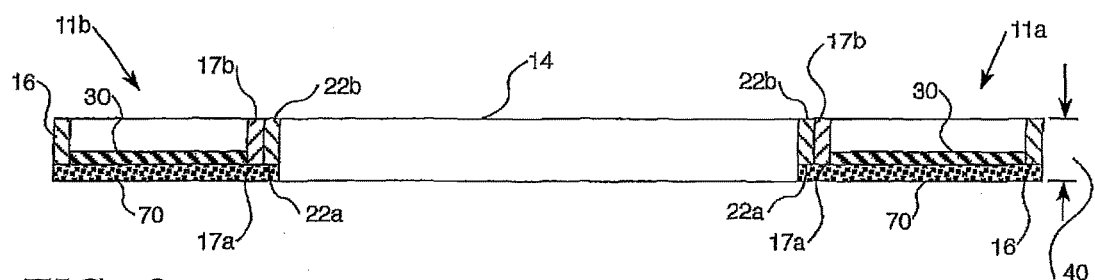
FIG. 9 is a top cross-sectional view of a wall structure of FIG. 5, at the vertical position where the window opening is located.

When secondary support members 20 and/or tertiary support members 22 are used with the wall structure 10 to form a secondary cavity 26, the secondary cavity 26 can be free of foam. For example, the foam layer 30 does not extend beyond and over the front secondary support surfaces 20a of the secondary members 20, the front tertiary support surfaces 22a of the tertiary support members 22, and/or beyond and over at least a portion of the front surfaces of other members that help form the secondary cavity 26. FIG. 9, for example, shows a top cross-sectional view with the foam layer 30 not extending beyond the front tertiary support surface 22a of the tertiary members 22. In such cases, corresponding openings may also be present in the foam panel 70. Such openings in the foam panel 70 can be formed by cutting out portions of the first foam panel 70 that cover portions of the wall structure that are to be free of foam, such as door and/or window frames, such as is described above.

The foam layer 30 is formed in-situ during the manufacturing process of the wall structure 10. The term "formed in-situ during the manufacturing process," as used in this specification, refers to the formation of a foam layer 30 as described in this specification during manufacturing of the wall structure 10 off-site at a facility remote or away from a building construction site. As such, the foam layer 30 may be formed not at a construction site as is required by conventional methods, but instead as a component of the pre-fabricated foamed wall structure 10.

The foam layer 30 is able to fill tight spaces and seal gaps that may not be visible to the naked eye. The foam layer 30 can also act as a vapor and thermal insulating barrier, which reduces energy consumption in buildings and residential homes when the wall structure 10 is used as a constituent wall panel. As indicated in this specification, the foam layer 30 may provide structural stability to the wall structure 10, such as excellent wall racking strength, when it has a relatively high density (as described above) and when it is spray applied in a location in which the air conditions, especially relative humidity and dew point, are maintained within particular conditional ranges during the spray application (also as described above).

After the foam layer 30 has expanded and cured, the substantially upright positioned wall structure 10 can be conveyed out of the spray foam application station. Thereafter, if desired, the foam layer 30 can be deflashed to remove excess foam material, such as any foam material that is deposited on the rear frame surface 11b. Various devices can be used for deflashing, such as a hoe or curry comb, among others.

As mentioned earlier, in cases where the wall structure 10 comprises two or more foam panels 70 adjacent with one another. A sealant, such as a tape (or other sealant material, such as a liquid sealer) can be applied to front surfaces of the foam panels 70 and over seams formed at adjacent sides of two foam panels 70.

The methods described in this specification can be used to produce pre-fabricated insulated wall structures that can be installed without any additional steps, thereby reducing the number of sub-contractors necessary to complete the installation of a wall at a construction site. In addition, the wall structure does not require additional materials such as exterior OSBs, and house wrap that are typically used in current residential building practices. Therefore, the wall structures described in this specification can decrease construction costs and/or decrease the overall cost per square foot per R-value.

As will be appreciated from the foregoing description, embodiments of the present invention are directed to wall structures. Some embodiments of the wall structures of the present specification comprise a) a first member; b) a second member spaced apart from the first member; c) connecting members extending between the first member and the second member, wherein the first member, the second member, and the connecting members each comprise a front surface and a rear surface that form the front frame surface and a rear frame surface; d) a foam panel attached to the front frame surface, such that foam panel, the first member, the second member, and the connecting members define a cavity within the frame; and e) a foam layer deposited in the cavity and adhered to the foam panel. Such wall structures have a racking strength of at least 500 pounds per linear foot (2224 N), such as at least 600 pounds per linear foot (2669 N), at least 800 pounds per linear foot (3559 N) or, in some cases, at least 900 pounds per linear foot (4003 N) foot, when the wall structure is tested without the presence as part of the wall structure of a wood panel, a plywood panel, an oriented strand board panel, a fibrous structural panel, a gypsum panel, and/or a composite panel that includes a wood panel or a fibrous panel, or, in some cases any other type of panel with a higher fastener pull-out strength than a foam panel. In some cases, such wall structures do not include any panels aside from foam panel(s).

As described above, the wall structures described in this specification also can impart a higher wall racking strength, in some cases extremely high racking strengths, and improve thermal performance in comparison to existing wall solutions through the combination of the foam layer 30 and the foam panels 70. Further, the wall structures described in this specification can help meet future R-value industry standards that are expected to increase in certain regions. With current fiberglass insulation, builders would have to convert 2×4-based wall designs to 2×6-based wall designs to ensure enough wall cavity capacity for additional insulation to meet such higher standards.

The wall structures described in this specification can also improve the consistency of installed insulation, and make it easy to install electrical and plumbing components, including components connected to exterior fixtures. The wall structures described in this specification can be used in new building construction or in retrofit or repair applications.

Various features and characteristics of the inventions are described in this specification to provide an overall understanding of the disclosed wall structures and method of manufacture. It is understood that the various features and characteristics described in this specification can be combined in any suitable manner regardless of whether such features and characteristics are expressly described in combination in this specification. The Applicant expressly intends such combinations of features and characteristics to be included within the scope of this specification. As such, the claims can be amended to recite, in any combination, any features and characteristics expressly or inherently described in, or otherwise expressly or inherently supported by, this specification. Furthermore, the Applicant reserves the right to amend the claims to affirmatively disclaim features and characteristics that may be present in the prior art, even if those features and characteristics are not expressly described in this specification. Therefore, any such amendments will not add new matter to the specification or claims, and will comply with written description and sufficiency of description requirements (e.g., 35 U.S.C. § 112(a) and Article 123(2) EPC). The wall structures and methods disclosed in this specification can comprise, consist of, or consist essentially of the various features and characteristics described in this specification.

Also, any numerical range recited in this specification describes all sub-ranges of the same numerical precision (i.e., having the same number of specified digits) subsumed within the recited range. For example, a recited range of "1.0 to 10.0" describes all sub-ranges between (and including) the recited minimum value of 1.0 and the recited maximum value of 10.0, such as, for example, "2.4 to 7.6," even if the range of "2.4 to 7.6" is not expressly recited in the text of the specification. Accordingly, the Applicant reserves the right to amend this specification, including the claims, to expressly recite any sub-range of the same numerical precision subsumed within the ranges expressly recited in this specification. All such ranges are inherently described in this specification such that amending to expressly recite any such sub-ranges will not add new matter to the specification or claims, and will comply with written description and sufficiency of description requirements (e.g., 35 U.S.C. §§ 112(a) and Article 123(2) EPC). Additionally, numerical parameters described in this specification should be construed in light of the number of reported significant digits, the numerical precision of the number, and by applying ordinary rounding techniques. It is also understood that numerical parameters described in this specification will necessarily possess the inherent variability characteristic of the underlying measurement techniques used to determine the numerical value of the parameter.

The grammatical articles "one", "a", "an", and "the", as used in this specification, are intended to include "at least one" or "one or more", unless otherwise indicated. Thus, the articles are used in this specification to refer to one or more than one (i.e., to "at least one") of the grammatical objects of the article. By way of example, "a component" means one or more components, and thus, possibly, more than one component is contemplated and can be employed or used in an implementation of the described processes, compositions, and products. Further, the use of a singular noun includes the plural, and the use of a plural noun includes the singular, unless the context of the usage requires otherwise.

EXAMPLES

Figure 10:
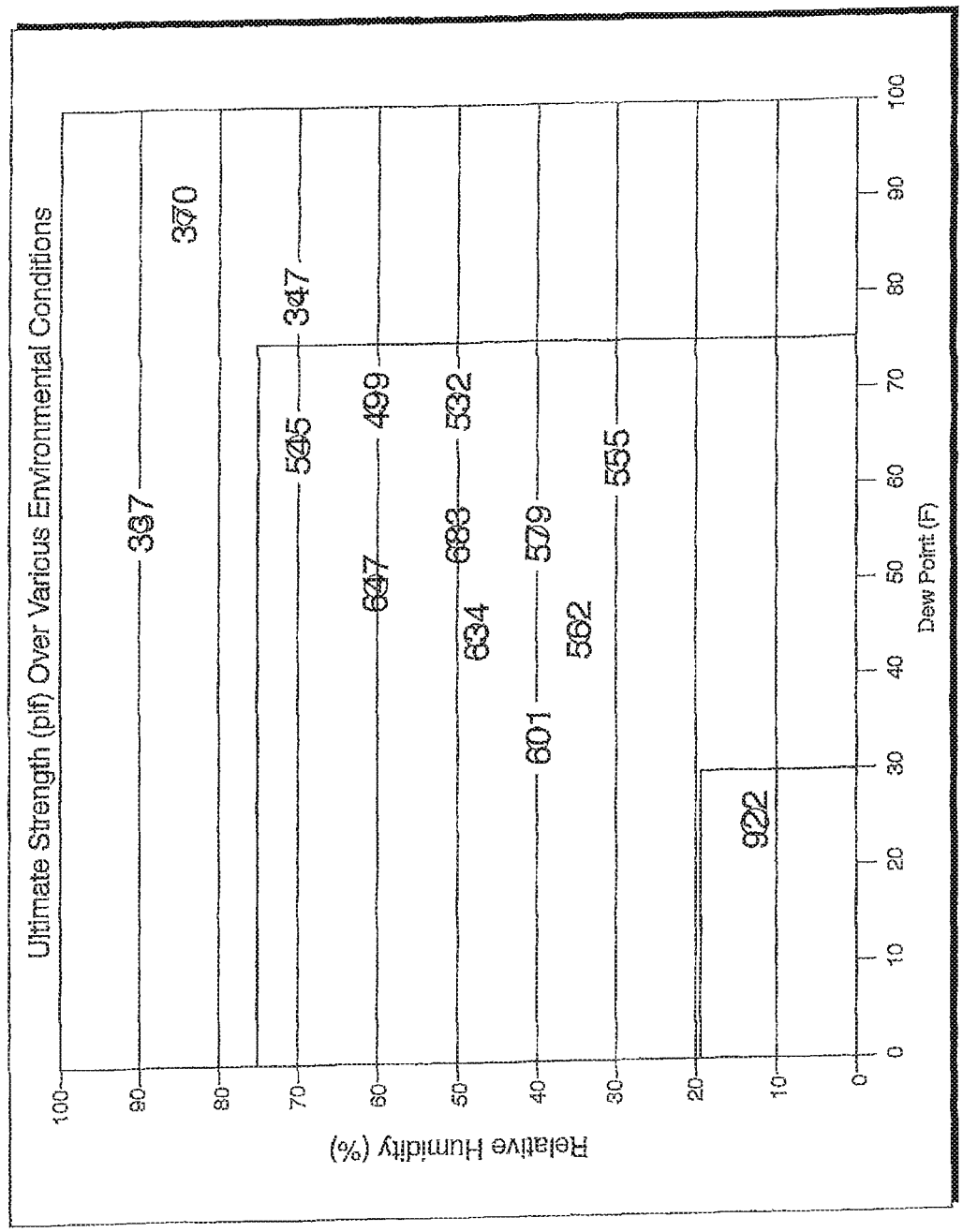
FIG. 10 is a chart of measured racking strengths of walls produced in the Examples.

2×4 studded 4 foot by 8 foot walls using 24 inch on stud spacing were sheathed with Hunter Xci CG polyiso board from Hunter Panels, a 1 inch thick polyisocyanurate (PolyISO) rigid wall insulation having a closed cell polyisocyanurate foam core faced with a coated glass-mat facer on both sides. The wooden studs were SPF No. 2 lumber and were constructed using 16d 0.131 framing nails. The ASTM C 1289 certified Type II, Class 2 Grade 2 PolyISO was attached using washers and nails to the stud frame. A spray polyurethane foam (Bayseal® CC STR) was sprayed into the wall cavities at a nominal thickness of 1.5 inches (3.8 centimeters) to provide a foam having a density of 3.2 lb/ft$^3$ (51.3 kg/m$^3$). The foam was applied using a Graco H-XP2 proportioner with a Graco CS Fusion gun. The processing temperatures for this machine were between 120° F. (48.9° C.) and 128° F. (53.3° C.). In each Example, the environmental conditions that the foam was applied to the wall cavities was controlled using a moisture control system that controlled both temperature and moisture content of the air in the area of foam application. Various tests were conducted at different air temperatures and air moisture contents. In each case, after the foam wall applied to the walls, the walls were allowed to cure for 48 hours before they were tested using a modified ASTM E72-15 testing protocol. The testing protocol differed from the ASTM E72-15 the walls were racked to failure in one single push instead of using 4 pushes of ever increasing force. The ultimate strength was recorded, as well as, the environmental conditions that the foam was applied to the walls. The results are presented in FIG. 10.

Walls that performed under a racking strength of 500 pounds per linear foot (plf) (2224 N) were classified to have performance that was below a traditional OSB sheathed wall that is common in the building construction industry. By keeping the relative humidity below 75% and the dew point below 70° F. (21.1° C.), superior walls of increased strength were able to be created. It was unexpectedly observed that reducing the dew point and relative humidity to level below a 30° F. (−1.1° C.) dew point and 20% relative humidity produced an extremely "strong wall" that far exceeded the average strength of walls created using the components described in this specification.

What is claimed is:

1. A method of manufacturing a high racking strength pre-fabricated insulated wall structure comprising:
   (a) spray applying a polyurethane foam-forming composition into a cavity of a wall structure, wherein the wall structure comprises:
      i) a first member;
      ii) a second member spaced apart from the first member; and
      iii) connecting members extending between the first member and the second member, wherein the first member, the second member, and the connecting members each comprise a front surface and a rear surface that form the front frame surface and a rear frame surface; and
      iv) a foam panel attached to the front frame surface, such that foam panel, the first member, the second member, and the connecting members define the cavity within the frame; and
   (b) allowing the polyurethane foam-forming composition to expand within at least a portion of the cavity to form a polyurethane foam layer deposited in the cavity,
   wherein the polyurethane foam layer is formed in-situ during the manufacturing method, and
   wherein the density of the polyurethane foam layer is 3.0 to 4.0 lb/ft$^3$ when measured according to ASTM D1622-08 and the wall structure is disposed in a climate-controlled spray application station throughout the spray applying wherein the relative humidity and dew point of the air in the climate-controlled spray application station is controlled throughout the spray applying so that the wall structure has a racking strength of at least 500 pounds per linear foot (2224 N).

2. The method of claim 1, wherein the method does not include attaching a wood panel, a plywood panel, an oriented strand panel, a fibrous structural panel, a gypsum panel, or a SIS to a front surface of the foam panel or a rear surface of the foam panel between the foam panel and the front frame surface.

3. The method of claim 1, wherein the relative humidity of the air in the climate-controlled spray application station throughout the spray applying is less than 75% and the dew point of the air in the climate-controlled spray application station throughout the spray applying is no more than 70° F.

4. The method of claim 3, wherein the dew point of the air is maintained at 20° F. to 30° F. throughout the spray application.

5. The method of claim 1, wherein the racking strength of the wall structure is at least 600 pounds per linear foot (2669 N).

6. The method of claim 5, wherein the racking strength of the wall structure is at least 900 pounds per linear foot (4003 N).

7. The method of claim 1, wherein the polyurethane foam layer comprises a thickness extending from the rear surface of the first foam panel to a position intermediate the front frame surface and the rear frame surface such that a gap is formed within the frame between a rear surface of the foam layer and the rear frame surface.

8. The method of claim 1, wherein the foam panel comprises a polyiso panel, an expanded polystyrene panel, or an extruded polystyrene panel.

9. The method of claim 8, wherein the foam panel comprises a polyiso panel comprising a polyisocyanurate foam layer and a facer material attached to a front face and a rear face of the polyisocyanurate foam layer.

10. The method of claim 9, wherein the facer material attached to the rear face comprises a coated glass fiber.

11. A method of manufacturing a high strength prefabricated insulated wall structure comprising:
(a) spray applying a polyurethane foam-forming composition into a cavity of a wall structure that is disposed in a climate-controlled spray application station, wherein the wall structure comprises:
i) a first member;
ii) a second member spaced apart from the first member; and
iii) connecting members extending between the first member and the second member, wherein the first member, the second member, and the connecting members each comprise a front surface and a rear surface that form the front frame surface and a rear frame surface; and
iv) a foam panel attached to the front frame surface, such that foam panel, the first member, the second member, and the connecting members define the cavity within the frame; and
(b) allowing the polyurethane foam-forming composition to expand within at least a portion of the cavity to form a polyurethane foam layer deposited in the cavity, wherein the density of the polyurethane foam layer is 2.8 to 4.0 lb/ft³ when measured according to ASTM D1622-08 and the relative humidity of the air in the climate-controlled spray application station throughout the spray applying is less than 75% and the dew point of the air in the climate-controlled spray application station throughout the spray applying is less than 75° F. (23.9° C.).

12. The method of claim 11, wherein the method does not include attaching a wood panel, plywood panel, or an oriented strand board panel to one or more of a front surface of the foam panel or a rear surface of the foam panel.

13. The method of claim 11, wherein the density of the polyurethane foam layer is 3.0 to 4.0 lb/ft³.

14. The method of claim 11, wherein the dew point of the air is maintained at 20° F. to 30° F. throughout the spray application.

15. The method of claim 11, wherein the racking strength of the wall structure is at least 500 pounds per linear foot.

16. The method of claim 15, wherein the racking strength of the wall structure is at least 900 pounds per linear foot.

17. The method of claim 11, wherein the polyurethane foam layer comprises a thickness extending from the rear surface of the first foam panel to a position intermediate the front frame surface and the rear frame surface such that a gap is formed within the frame between a rear surface of the foam layer and the rear frame surface.

18. The method of claim 11, wherein the foam panel comprises a polyiso panel, an expanded polystyrene panel, or an extruded polystyrene panel.

19. The method of claim 18, wherein the foam panel comprises a polyiso panel comprising a polyisocyanurate foam layer and a facer material attached to a front face and a rear face of the polyisocyanurate foam layer.

20. The method of claim 19, wherein the facer material attached to the rear face comprises a coated glass fiber facer material comprises coated glass fibers.

21. The method of claim 3, wherein the temperature of the air in the climate-controlled spray application station throughout the spray applying is 60° F. to 80° F.

22. The method of claim 4, wherein the temperature of the air in the climate-controlled spray application station throughout the spray applying is 60° F. to 80° F.

23. The method of claim 16, wherein the temperature of the air in the climate-controlled spray application station throughout the spray applying is 60° F. to 80° F.

24. The method of claim 14, wherein the temperature of the air in the climate-controlled spray application station throughout the spray applying is 60° F. to 80° F.

25. The method of claim 21, wherein the temperature of the polyurethane foam-forming composition during the spray applying is 120° F. to 128° F.

26. The method of claim 23, wherein the temperature of the polyurethane foam-forming composition during the spray applying is 120° F. to 128° F.

* * * * *